(Model.)
G. A. FAAS.
EXTENSION TABLE.
No. 290,180. Patented Dec. 11, 1883.
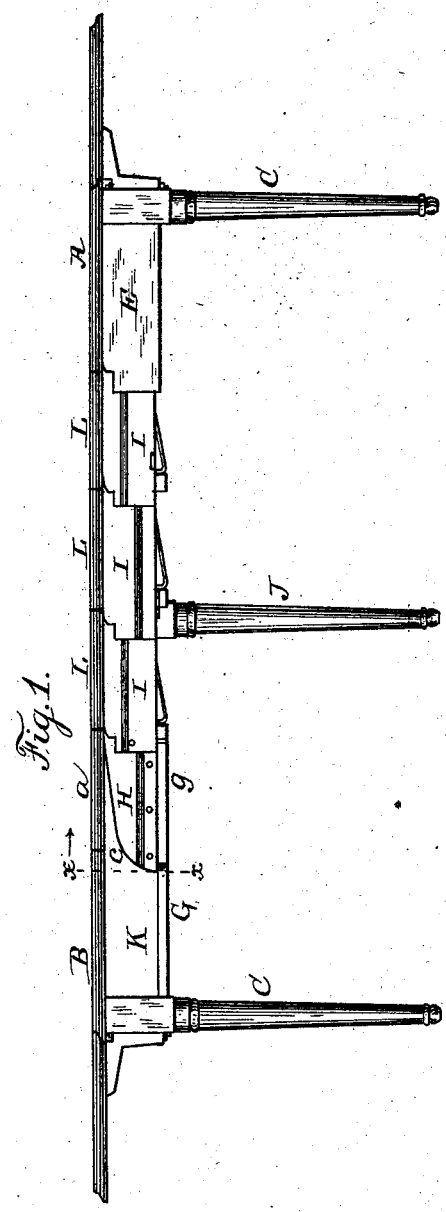
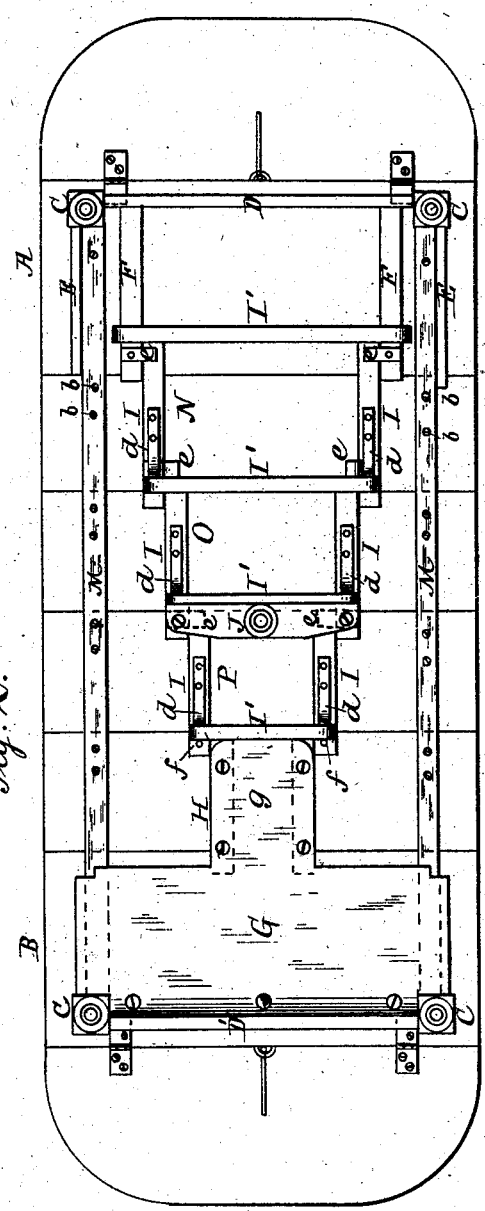
Witnesses:
Edmund Brodhag
R. E. Trautz
Inventor:
Gus. A. Faas
by Johnson & Johnson
Attys (Model.)

3 Sheets—Sheet 2.

G. A. FAAS.
EXTENSION TABLE.

No. 290,180. Patented Dec. 11, 1883.

Witnesses:
R. E. Grant
Edmund Brodkay

Inventor:
Gus. A. Faas
by Johnson & Johnson
Attys (Model.)

3 Sheets—Sheet 3.

G. A. FAAS.
EXTENSION TABLE.

No. 290,180. Patented Dec. 11, 1883.

Witnesses:

Inventor:
Gus A. Faas
by Johnson & Johnson
Attys

UNITED STATES PATENT OFFICE.

GUSTAV A. FAAS, OF LAWRENCE, KANSAS, ASSIGNOR OF ONE-FOURTH TO ARTHUR P. USHER, OF SAME PLACE.

EXTENSION-TABLE.

SPECIFICATION forming part of Letters Patent No. 290,180, dated December 11, 1883.

Application filed March 22, 1883. (Model.)

*To all whom it may concern:*

Be it known that I, GUSTAV A. FAAS, a citizen of the United States, residing at Lawrence, in the county of Douglas and State of Kansas, have invented new and useful Improvements in Extension-Tables, of which the following is a specification.

My invention is directed to the improvement of that class of extension-tables in which the movable leaves are united together as permanent attachments of the table, and operated with it as it is closed and opened, as distinguished from such tables in which the leaves are put on when it is extended and taken off when it is contracted.

My invention consists, primarily, in the combination, with the table ends supported by legs and telescoping slides or frames connected therewith, of movable leaves connected together and to the said table ends by tapes in such manner as to be moved into position upon the telescoping slides between the table ends when extended, and to be folded away into one of said table ends by the closing up of the table. The movable leaves are connected by tapes or cords in such manner as to allow them to be automatically placed in position one upon another in contracting the table, and the construction is such that the movable leaves are folded at one end of the table, while the slides which support the movable leaves when extended are telescoped within the other end of the table in the operation of bringing the table ends together. In this operation of folding the leaves they are not only directed within a holding space in the table end, but the connection of the leaves is such as to allow them to be placed compactly upon each other in horizontal positions beneath the top of the table end. This guiding and direction of the connected leaves is effected by the form of the central part of the telescoping slides, which is fixed to that end of the table into which the leaves are moved.

Figure 3:
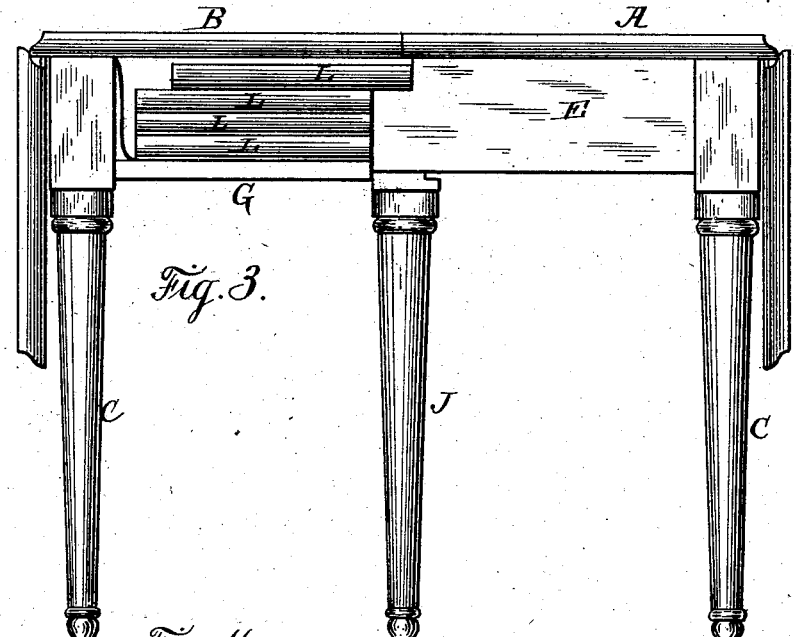
Figure 4:
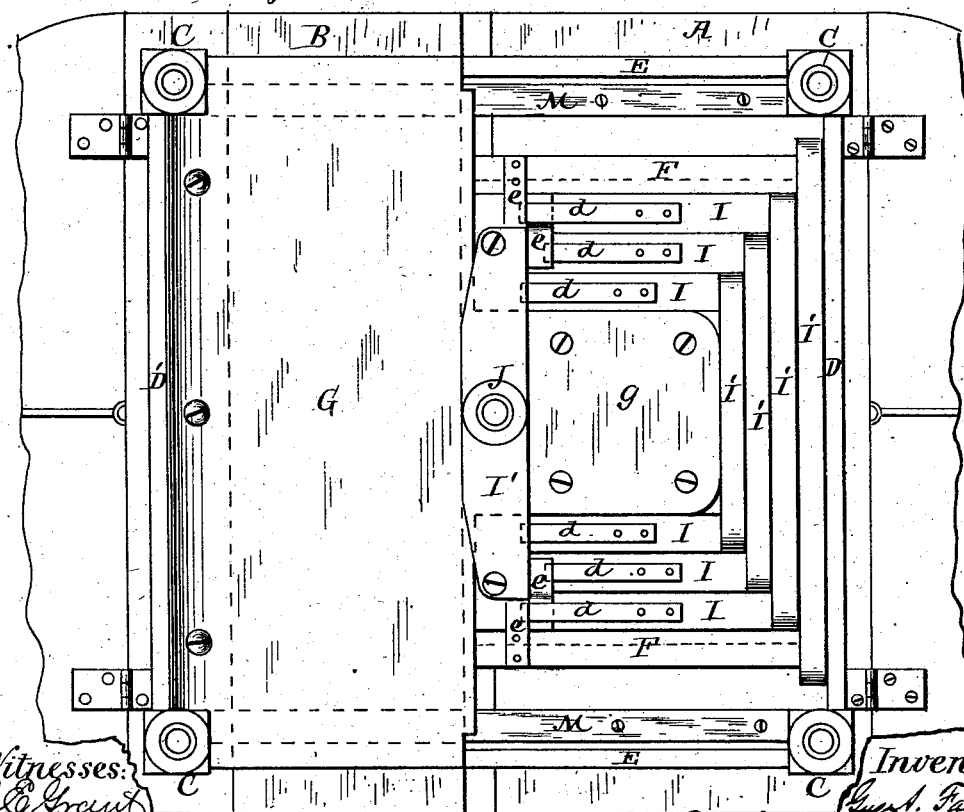
Figure 5:
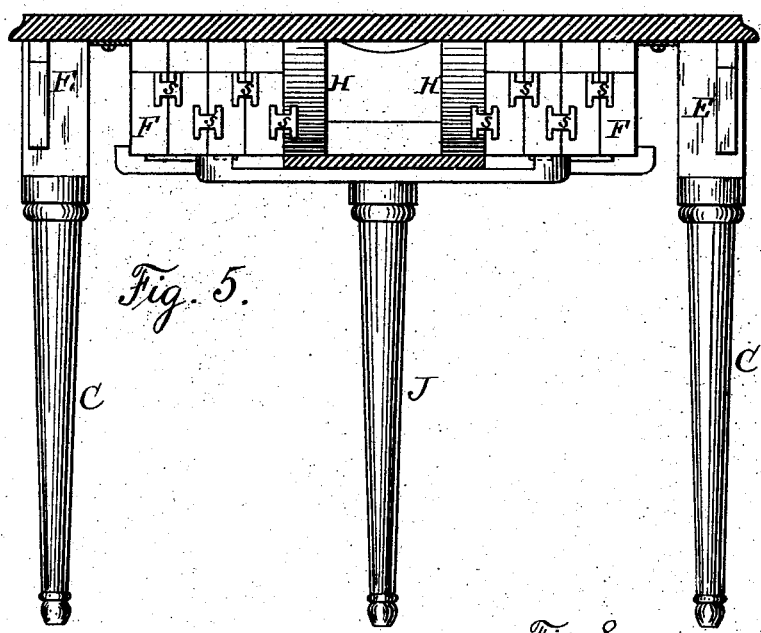
Figure 8:
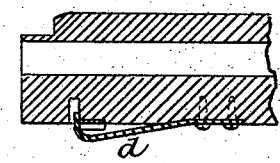
Figure 6:
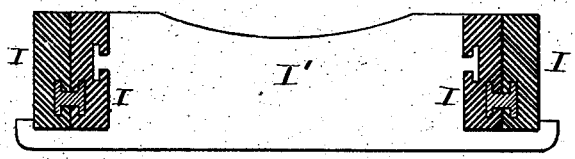
Figure 7:
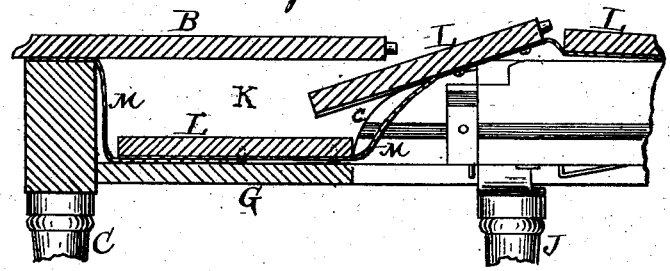

Referring to the accompanying drawings, Figure 1 represents a side elevation of an extension-table as extended, embracing my improvements; Fig. 2, a bottom view of the same; Fig. 3, a side view of the table when closed, with the movable connected leaves folded within one of the table ends; Fig. 4, a bottom view of the same; Fig. 5, a cross-section on the line $x$ $x$ of Fig. 1; Fig. 6, a cross-section of one of the telescoping frames; Fig. 7, a section showing the manner of folding the leaves in closing the table, and Fig. 8 a detail showing the spring-stops of the telescoping sides.

The ends A B of the table are supported by legs C secured to the cross-bar D, and they may be provided with hinged leaves, as shown. One of the table ends, A, has side bars, E, and between these and near them are bars F, having horizontal grooves on their inner sides, and to which the telescoping slides are connected and between which they are moved when the table is closed, as shown in Fig. 4. The other table end, B, has no side bars; but a bottom board, G, is fastened to the cross-bar D', and has a central inward projection, $g$, to which is secured a fixed section, H, of the telescoping slides having grooves in its outer sides, and arranged in the same horizontal plane as the fixed bars F of the other table end. Intermediately between these fixed grooved end parts are arranged the telescoping frames, each composed of side bars, I, and a cross-bar, I', each diminishing in width, so that they are adapted to telescope or slide within each other, and all between the fixed end bars, F F, when the table is closed. For this purpose each of the movable slides is provided with horizontal T-grooves in different vertical planes on their inner and on their outer sides, as shown in Fig. 5, within which move the I-shaped casting $s$, which are secured in the grooves of certain of the slides and move in the grooves of the others, as in extension-tables constructed with the ordinary telescoping side bars.

A leg or legs, J, are secured to one or more of the cross-bars I' of these slides to support them when extended. The upper sides of these telescoping slides are on a plane with the under side of the table-top, and upon them rest the movable leaves of the table when extended, as shown in Fig. 1. The fixed section H of the telescoping parts occupies a position just under the movable leaf $a$, Fig. 1, which joins the table-end B when the table is extended, and it is curved or inclined downward at $c$, so as to leave an unobstructed space, K, beneath the table end B, the board G forming the bottom of said space, and the curved end $c$ of the section H joining said bottom. The movable leaves L are connected together by tapes M, fastened to their under sides near each end, and the ends of these tapes are fastened to the under sides of the table ends A B, as shown in Fig. 2, thereby making the movable leaves permanent attachments of the table. The tapes are not connected to the leaves, so as to hinge-joint them at their meeting edges, but the tapes are connected to only about half the width of the leaves, such connection being made at that edge of each leaf nearest the table end A, as shown in Fig. 2, by screws or tacks $b$, leaving the other edge of the connected leaves unattached to the tapes, as shown in Fig. 7. In the extended form of the table the movable leaves are supported upon the telescoping slides and fastened by the usual dowel-pins, as shown in Fig. 1.

To close or contract the table, the leaf $a$, above the inclined top of the fixed telescoping section H, is separated from the dowel-pins of the table end B, so as to allow it to fall upon the section H in position to pass under said table end, as in Fig. 7. The closing of the table ends will then automatically cause each of the connected leaves L to be moved upon and over the inclined guide H, and placed in the space K, one upon the other flatwise, and allow the table ends to come together over the leaves, as in Fig. 3. In this movement the leaves only require to be separated from the dowel-pins, and for this purpose the leaves are connected to the tapes with sufficient slack, so as to allow of their separation just to clear the dowel-pins as they are moved down upon the inclined guide. As each leaf is moved upon the guide it drops flatwise upon the bottom board, G, while the adjacent edge of the succeeding leaf is held up by the guide H, so that it will be moved over upon the first leaf, and so on until all the leaves are placed away. This placing of the leaves one upon another is allowed by reason of the slack in their connecting-tapes and the non-hinging of the leaves at their edges, as described.

As it is necessary in closing the table that the leaves shall be pushed in succession into the space K by the table-top A, so is it necessary that the fixed grooved bars F F of the table end A shall be first moved over the bars I I of the widest telescoping section N, and then this section is moved over the next O, and so on until all the telescoping sections are moved together over the smallest one P, and then over the fixed guide-section H, as in Fig. 4, bringing the table ends together.

To allow of the successive closing of the telescoping sections, the side bars, I I, are provided with spring-stops $d\ d$ on their under sides, arranged so as to spring down behind the ends of the cross-bars I', (when drawn out,) which connect the side bars of each section, so that the spring-stops $d\ d$ of one section abut against the cross-bar of the next fitting section, and thus prevent the closing of the sections, except in the order stated. As each section is closing within the other, plates $e\ e$ on the side bars move over and close the spring-stops $d\ d$ with the side bars, I I, so as to allow them to pass through the slotted ends of the cross-bars, which extend over the side bars, as shown. The I-shaped castings $s$ placed in the grooves of the slides, form stops to limit their opening and closing movements, as is well understood in extension-table slides, while pins $f\ f$ and the plates $e\ e$ of the bars F serve as additional stops to limit the opening movements of the table ends.

Referring to the function of the fixed inclined or curved guide-support H, it will be seen that it both supports and directs the leaves in proper positions while being slid under into the space K, and causes them to separate their dowel-connections $a'$ while descending said support in closing the table, and that it serves to direct the leaves upward in inclined positions to make the dowel-connections in opening the table ends. It is also important to notice that the tapes M connect at each end with the table ends A B, so that in opening the table the tapes draw the last leaf in a level position above the curved guide-support H, so that said leaf may be fastened to the dowel-pins $a'$ of the table end B.

I claim—

1. In an extension-table, the combination, with the extensible table ends and intermediate movable connections therefor, of the self-adjusting leaves and the tapes or flexible strips connecting said leaves in non-jointed relation to each other and to the table ends, substantially as described, for the purpose specified.

2. In an extension-table, the table end B, having the casing G, provided with the fixed inclined or curved guide-support H, in combination with the telescoping slides, the table end A, the self-adjusting leaves, and the tapes connecting them in non-jointed relation to each other and to the table ends, substantially as described, for the purpose specified.

3. The movable leaves of an extension-table connected by tapes in non-jointed relation to each other and to the table ends, substantially as described, in combination with the table end B, having the casing G and the fixed inclined or curved guide-support H, and the table end A, having the fixed bars F F and the slides provided with suitable spring-stops, substantially as described, for the purpose specified.

4. The combination, in an extension-table, of the self-adjusting leaves provided with dowel-pin connections $a'\ a^2$, the tapes M, connecting said leaves on their under sides about half their width, leaving the other half unattached, the table ends A B, to which said tapes are also attached, the intermediate movable connections for said table ends, and the curved guide-support H, whereby the leaves and the table ends are connected to each other and the last leaf put in place in opening the table is brought into horizontal position with the table end B upon the curved guide-support, substantially as described.

5. The table end B, having the casing G, provided with a middle inward projection, $g$, and the fixed inclined or curved guide-support H, in combination with the table end A, the telescoping slides, the self-adjusting leaves, provided with dowel-connections $a'$ $a^2$, and the tapes M M, connecting said leaves together and with the table ends, substantially as described, for the purpose specified.

6. The combination, with the table ends A B and the curved guide-support H, of the self-adjusting leaves, the tapes M M, connecting them in non-jointed relation to each other and to the table ends, and the telescoping slides provided with spring-stops $d\ d$, and the plates $e\ e$, substantially as described, for the purpose specified.

7. In combination, the extensible table ends A B, the end casing, G, the fixed inclined or curved guide-support H, the self-adjusting leaves, their connecting-tapes M M, and the telescoping sections provided with the spring-stops $d\ d$, and the plates $e\ e$, all constructed and arranged substantially as herein set forth.

In testimony whereof I have hereunto set my hand in the presence of two subscribing witnesses.

GUST. A. FAAS.

Witnesses:
EDMUND B. BENSELL,
ANTHONY J. FAAS, Jr.